United States Patent [19]

Miller

[11] Patent Number: 4,869,378

[45] Date of Patent: Sep. 26, 1989

[54] MOUNTING RAIL FOR HOSPITAL APPLIANCES AND BRACKET

[75] Inventor: David H. Miller, Walnut Creek, Calif.

[73] Assignee: Hospital Systems, Inc., Oakland, Calif.

[21] Appl. No.: 237,442

[22] Filed: Aug. 29, 1988

[51] Int. Cl.⁴ .............................................. A47F 5/08
[52] U.S. Cl. ...................................... 211/94; 211/62; 248/225.1
[58] Field of Search ................... 248/225.1, 297.2, 228, 248/229, 231.2, 316.1, 316.3; 211/94, 162

[56] References Cited

U.S. PATENT DOCUMENTS

| | | | |
|---|---|---|---|
| 2,896,896 | 7/1959 | Revzin | 248/229 |
| 3,857,643 | 12/1974 | Bardocz | 248/228 X |
| 4,498,693 | 2/1985 | Schindele | 248/222.1 X |
| 4,602,756 | 7/1986 | Chatfield | 248/225.1 |
| 4,607,753 | 8/1986 | Radek | 211/94 X |
| 4,678,151 | 7/1987 | Radek | 211/94 X |
| 4,693,381 | 9/1987 | Lodge | 211/94 |
| 4,725,030 | 2/1988 | Miller et al. | 248/231.2 X |
| 4,771,897 | 9/1988 | Ho | 211/94 X |

Primary Examiner—Ramon O. Ramirez
Attorney, Agent, or Firm—Julian Caplan

[57] ABSTRACT

A mounting rail is attached, preferably horizontally to a wall or a hospital wall unit. The front of the rail has a longitudinal opening, the upper edge of the opening being offset downward. Inside the front of the bar the opening widens out upwardly and, to a lesser extent, downward. Longitudinal rounded cross-section grooves are formed in the top and bottom of the bar, spaced slightly inward from the front. Many different styles of clamps for hospital equipment brackets fit the rail. In one form of bracket clamp has a back face which fits flush with the front of the bar and has a top stud with a downward bead which fits into the top longitudinal groove. The bottom stud is rotatable and has a rounded cross section stud formed with a flat. When the flat is uppermost, the clamp may be removed or slid along the bar, but when turned away from the bar the clamp is locked. A twist dial on the front of the clamp turns the lower stud.

16 Claims, 3 Drawing Sheets

MOUNTING RAIL FOR HOSPITAL APPLIANCES AND BRACKET

BACKGROUND OF THE INVENTION

1. Field of the Invention

This invention relates to a new and improved mounting rail. The rail is of the type horizontally mounted on a hospital wall or on wall-mounted units which enclose wires and piping in a housing. Various types of equipment and appliances used in installations such as intensive care units and emergency rooms are hung on or clamped to such rails. The present invention is an improved rail structure making it possible to hang or clamp a wide variety of pieces of equipment and to use with such rail different kinds of brackets and clamps. The invention also relates to an improved clamp having a rotating knob which locks the clamp on the rail or, when turned in proper position makes it possible to remove the clamp or to slide the clamp longitudinally along the rail.

2. Description of Related Art

Rails of this general type are commonly used in hospitals Such rails are either separate from or incorporated in hospital wall units. One particular type of rail is shown in U.S. Pat. No. 4,498,693 [Fairfield] being generally rectangular in external shape and having along the top and bottom adjacent the front face longitudinal grooves. Clamps such as shown in said patent cooperate with such grooves to clamp a bracket onto the rail so that it may slide or be fixed thereon or be removed therefrom. It will be understood that many different styles of rails and clamps have heretofore been used in the hospital equipment industry.

SUMMARY OF THE INVENTION

The rail of the present invention is preferably an aluminum extrusion which is rectangular in its external shape. Top and bottom longitudinal grooves are formed in the top and bottom of the rail adjacent the front edge thereof. Such grooves are useful with several different types of clamps as hereinafter explained. An opening is formed in the front of the rail, the top edge of such opening being spaced a distance from the top edge of the rail greater than the bottom edge of the opening is spaced from the bottom edge of the rail. Inwardly of the front face the opening widens out by extending upward and also to a lesser extent downward. The shape of the opening makes it possible to hang various types of wire brackets and shelves and also makes it possible to engage certain types of clamps hereinafter explained.

Used with the rail are brackets having clamps which are preferably attached to and removed from the rail and also slide longitudinally but can be locked in place. One common clamp is generally C-shaped, one arm fitting into the opening in the front of the rail and the other fitting under the rail and carrying a locking screw of the set screw type which engages the bottom longitudinal groove. It will be understood that such clamp may be reversed in position.

The Fairfield clamp heretofore explained also has a generally C-shaped body, one arm of the C engaging the top longitudinal groove of the rail and the other carrying a cam-biased plunger which is forced into the bottom groove by a cam internal of the body of the clamp, the cam being turned by a lever.

Various types of wire racks and shelves may be hung from the clamp. Such wire products have a horizontal stretch which rests on the bottom edge of the opening and an upward bent stretch internal of the opening which engages the wall of the opening and thus supports the rack or shelf, permitting it to be moved longitudinally or to be removed as desired.

The present invention also comprises a novel clamp which has a body which bridges over the opening in the front of the rail. Extending rearward from the body is a fixed stud having a bead which fits into the top longitudinal groove of the rail. Below the rail is a rotatable bead formed with a flat. When the flat is uppermost, the clamp may be removed from the rail. When the clamp is turned so that the flat is no longer close to the rail, the bead clamps into the bottom longitudinal groove. It will be understood of course that this type of clamp may be reversed in position in that the fixed stud may engage the bottom groove rather than the top.

A feature of the invention is the fact that the rail may be used with many different types of clamps and brackets produced by many different manufacturers.

DESCRIPTION OF PREFERRED EMBODIMENT

Figure 1:
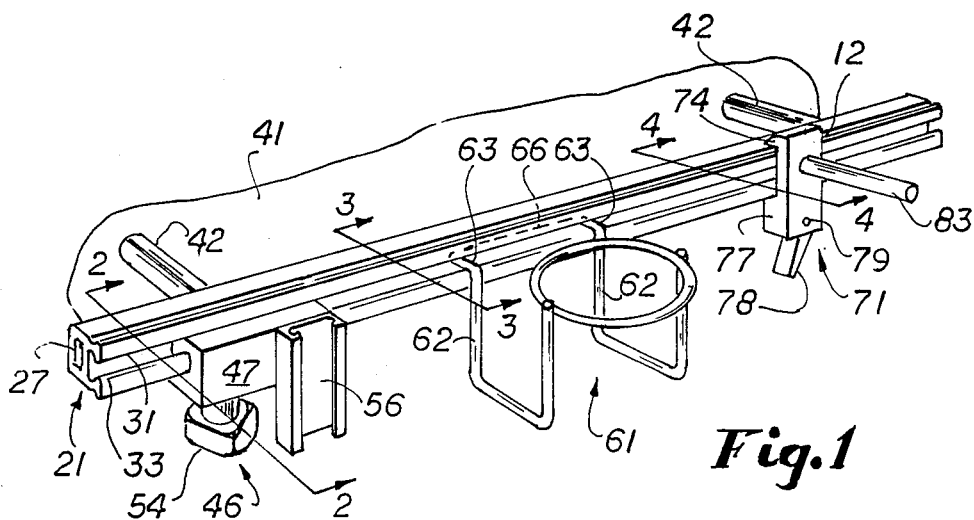
FIG. 1 is a schematic perspective view showing a rail in a with the present invention mounted on a wall and supporting three exemplars of devices which may be employed therewith.

Mounting rail 21 is generally rectangular in its external shape having a back 22, a front 23, top 24 and bottom 26. To reduce material and weight, a longitudinally-extending void or hollow 27 is formed in the rearward portion of rail 21. The external corners are rounded to reduce likelihood of injury.

An opening is formed in the front 23, the top edge 31 of said front opening being closer to top 24 than the bottom edge 33 of the opening is spaced from the bottom 26. The opening widens out and has an upward interior extension 32 and a downward interior extension 34, the former being greater than the latter. Thus the interior of the opening is generally a vertically elongated rectangle. The interior corners are rounded. The back 36 of the opening is generally perpendicular to front 23.

Formed on top 24 spaced inwardly from front 23 is a top longitudinal groove 37 and formed on bottom 26 is a corresponding bottom longitudinal groove 38.

The rail 21 may be mounted in various ways on a hospital wall, on a wall mounted unit of the type which contains wiring and medical gases and in various other locations. Alternatively, the rail 21, may be formed as a part of a wall mounted unit. In FIG. 1 a back wall 41 is shown and mounting studs 42 extend outward therefrom and are attached to back 22 in any convenient manner. This is merely one suitable mounting.

Figure 2:
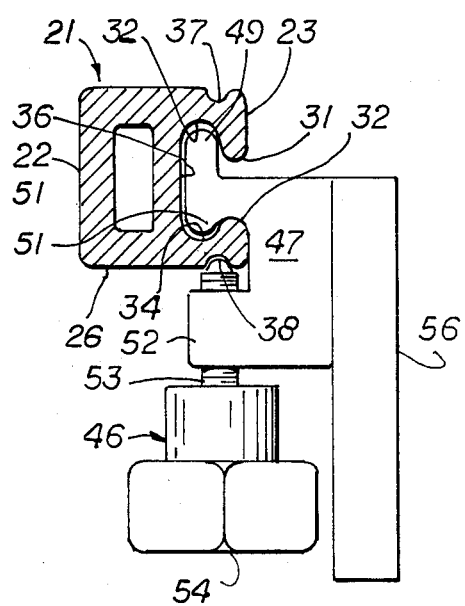
FIG. 2 is a side view of one clamp, viewed along the line 2—2 of FIG. 1.

An important feature of the rail 21 is the fact that it may be used with many different types of clamps and brackets. In FIG. 2 a screw-type clamp 46 is shown having a body 47 from which projects rearward top rear extension 48 dimensioned to fit in the opening between edges 31 and 33, there being an upward extension 49 which partially fills the upward exterior of the upward interior extension 32 and a bottom rear extension 52 which extends almost down to the bottom of extension 34. In practical effect, the screw clamp 46 hangs from rail 41 by reason of the fact that the bottom of extension 48 rests on bottom edge 33. There is a bottom rearward extension 52 of the body 47 which fits partially under rail 31. A tapped hole in extension 52 receives a locking screw 53 which fits into the groove 38 and is turned by a knob 54. When the screw 53 is tightened, the clamp 46 is locked relative to the rail 21. When the screw 53 is partially loosened, the clamp may slide longitudinally relative to the rail 21. When the screw 53 is loosened additionally, the clamp may be removed from the opening in the rail 21 by rotating the body 47 counterclockwise (as viewed in FIG. 2) until the extension 51 clears the edge 33 and then removing the extension 49. Various pieces of equipment may be attached to the clamp 46. As representative thereof a channel 56 is shown in FIGS. 1 and 2 but it will be understood that many other types of holders for equipment may be used with clamp 46.

Figure 3:
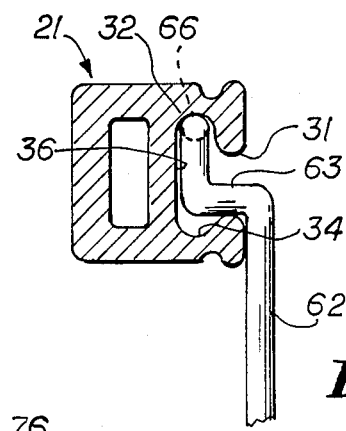
FIG. 3 is a fragmentary side view showing a wire catheter container holder which is representative of different wire brackets and shelves which may be used with the rail, all as viewed along the line 3—3 of FIG. 1.

A common catheter container holder 61 is shown in FIG. 1 as representative of many other types of pieces of equipment which are formed of wire. The holder 61 is shown partially in FIG. 3. Thus there are on either side of the holder 61 upward vertical extending wires 62 formed with inward bends 63 which rest on bottom edge 33. Upward bends 64 extend up to the top of the opening in the rail 61 and the upper ends thereof are interconnected by a longitudinal stretch 66. It will be seen from FIG. 3 that by rotating the holder 61 counterclockwise, the sections 64 and 66 may be removed from the opening in the rail 21. No means is shown in the present invention for locking the holder 61 in place but in other respects it functions similar to the clamps heretofore and hereinafter described.

Figure 4:
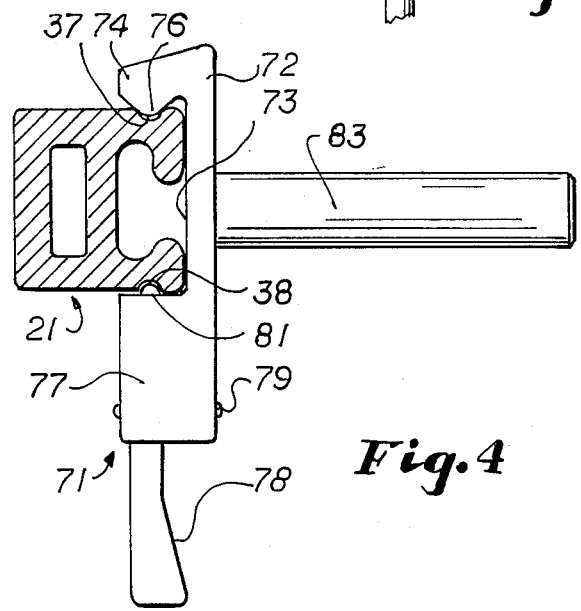
FIG. 4 is a view showing a Fairfield-type clamp attached to the rail as viewed substantially along the line 4—4 of FIG. 1.
Figure 10A:
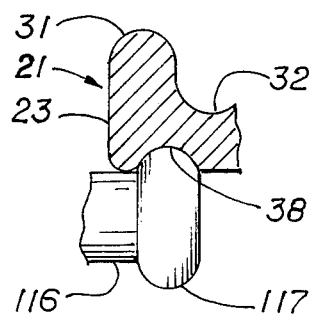
FIGS. 10A, 10B and 10C are schematic, enlarged sectional view showing how the rotatable stud clamps against the rail, engages the rail so that the clamp may slide and is turned so that the clamp may be removed, respectively.
Figure 10B:
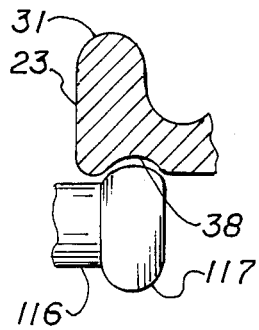
Figure 10C:
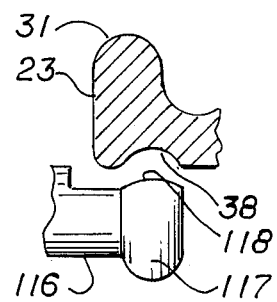

A "Fairfield" type clamp 71 is shown in FIGS. 1 and 4. Such a clamp is commercially available and has a vertically extending body 72 in front of the opening in the rail 21. At the top is a top rear extension 74 having a bead 76 on its lower surface which fits into the top longitudinal groove 37. On the bottom of body 72 is a rearward extension 77 which fits partially under the rail 21. A lever 78 extends internally of extension 77 and is pivoted relative to body 72 by pin 79. Not shown in the accompanying drawings but well known in the art is an internal cam turned by lever 78 which bears against the lower end of plunger 81, the upper end of which fits into the lower longitudinal groove 38. By pivoting the lever 78 the plunger 81 may be locked in the groove 38 or loosened sufficiently so that the clamp may be slid longitudinally of rail 21, or when plunger 81 is completely retracted, the clamp may be removed from the rail. Various pieces of equipment are attached to a Fairfield clamp 71. As representative is an outward extending rod 83 to which various pieces of equipment may be attached. It will also be understood that the clamp 71 may be inverted from the position shown in FIG. 4.

Figure 5:
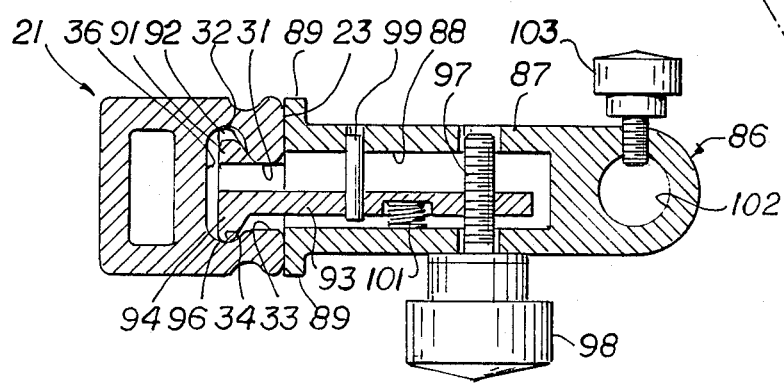
FIG. 5 is a fragmentary sectional view showing a different type of clamp used with the rail of the present invention.
Figure 11:
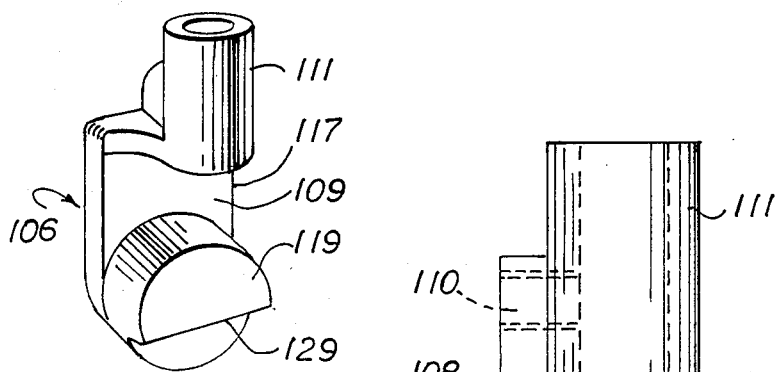
FIG. 11 is a view similar to FIG. 6 of a further modification.
Figure 7:
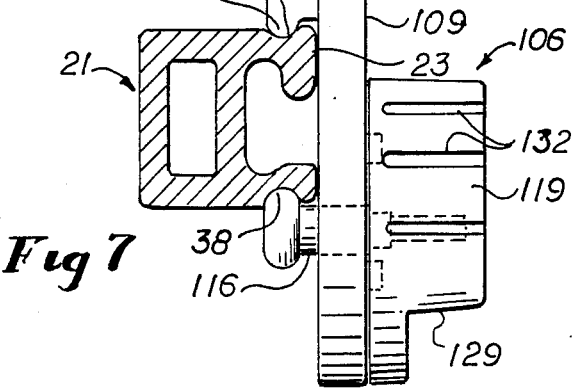
FIG. 7 is a side elevation of the clamp of FIG. 6.

FIG. 5 shows use of rail 21 with a removable bracket such as that shown in U.S. Pat. No. 4,725,030 issued Feb. 16, 1988. Reference is made to said patent for details of construction and operation of the clamp. However, for the purpose of the present invention, the clamp may be said to have a body 87 formed with a hollow 88 and having vertical top and bottom feet 89 which bear against the front 23 above and below the openings 31, 33. Extending from body 91 is a fixed leg 91 which fits inside the opening in rail 21 and has an upward extending finger 92 inside the opening. Movable within hollow 88 is a dog 93 having at its outer end a movable lug 94 formed with a downward extending foot 96, the lug 94 and foot 96 being within the opening in rail 21. A screw 97 turned by knob 88 engages the dog 93 to cause it to move up or down as viewed in FIG. 5. Pin 99 ensures alignment of dog 93 and spring 101 biases it to open position. As shown in FIG. 5, the clamp 86 is locked. This means that the fixed lug 91 engages the edge 31 and the movable lug 94 engages the edge 33. When the knob 98 is turned, the dog 93 is lifted (as viewed in FIG. 5) so that the internal movable lug 94 no longer engages edge 33. Therefore the clamp 86 may be moved longitudinally of the rail 21. When the knob 98 is further turned, the dog 93 is in completely retracted position and the clamp may be removed from the rail 21. Various pieces of equipment may be hung from the bracket 86. As shown, there is a hole 102 to receive a rod which is held in place by said screw 103. This is merely representative of many other ways in which appliances and equipment may be supported by clamp 86.

Directing attention now to the cam actuated clamp and bracket 106 shown in FIGS. 6–11, there is a body 107 having a substantially flat, generally vertically disposed back face 108 which bridges the opening in front 23 and a front face 109. Again, many different types of equipment may be supported by such a bracket but as shown herein there is a socket 111 at the top having a vertical hole to receive a rod or other connecting means and there is a tapped hole 110 for a set screw or the like (not shown).

Extending rearward from rear face 108 above the level of top 24 is a fixed top lug 112 having a downward extending bead 113 which fits into the top longitudinal groove 37. Rotatable in body 107 below the level of bottom 26 is a pin 116 having a round knob 117 on its rearward end formed with a flat 118. Attached to pin 116 is a knob 119, there being a noncircular end 120 formed on the forward end of pin 116 which fits into a non-circular hole in knob 119 and is held in place by set screw 121 or other suitable means.

Figure 8:
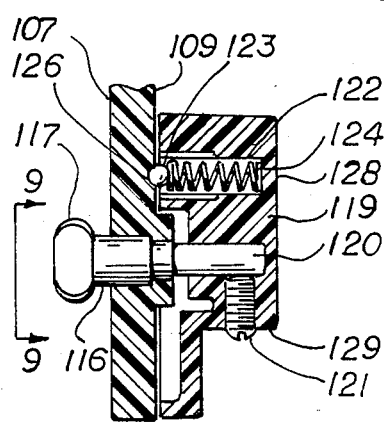
FIG. 8 is an enlarged fragmentary sectional view of a portion of the structure of FIG. 7.
Figure 6:
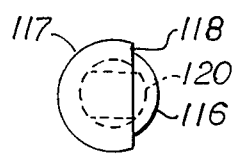
FIG. 6 is a front elevational view partly broken away in section showing an improved clamp attached to a rail.
Figure 9:
FIG. 9 is a fragmentary end elevational view as viewed along the line 9—9 of FIG. 8.

A hole 122 is formed in a portion of knob 119 remote from pin 121 and disposed therein is a detent ball 123 biased to the left as viewed in FIG. 8 by spring 124 in said hole 122. A series of depressions 126 is formed in front face 119 into which the ball 123 fits. Stops 127 are also formed in front face 109 to limit the extent of turning of knob 119 relative to body 107. On the outer face 128 of knob 119 are indicia 131 associated with the positioning of ball 123 and respective depressions 126. To facilitate turning the knob, a flat 129 is formed thereacross (see FIGS. 6 and 8). To further facilitate turning knob 119, grooves 132 are formed in the sides thereof.

In use of the clamp 106 shown in FIGS. 6–11, knob 119 is rotated until the indicium marked "OFF" is uppermost. In this position, the knob 117 is turned so that the flat 118 is closest to rail 21. The ball 123 fits into the appropriate depression 126 to hold the knob in such position. As shown in FIG. 10C, the knob 117 is out of engagement with the longitudinal groove 37 and the clamp may be twisted somewhat counterclockwise and pulled away from the rail. When the clamp 106 is reinstalled in the rail 21, the knob 119 is turned so that the knob 117 is loosely in the groove 37 (FIG. 10B). This is permits sliding of the clamp relative to the rail. The indicium marked "SLIDE" is then uppermost. When the knob is turned so that the indicium "LOCK" is uppermost, the knob 117 is forced tight into the groove 37, preventing relative movement of the clamp and the rail. It will be understood that clamp 106 may be inverted from the position of FIG. 7.

Figure 12:
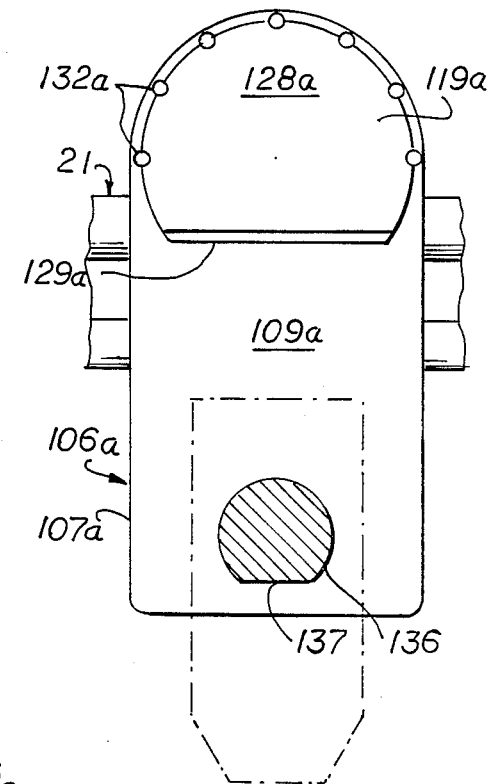
FIG. 12 is a different embodiment of the clamp.

Details of construction of the clamp 126 are subject to considerable variation. One variation is shown in FIG. 12. In this version, clamp 106a has the knob 119a on top and the body 107a extending below the rail 21. In other respects the construction of the clamp 106a resembles that of the preceding modification and the same reference numerals followed by the subscript a are used to designate corresponding parts. In this particular version, to attach various pieces of equipment, a rod 136 extends out from the front face 109a and may be formed with a flat 137 to prevent rotation of equipment attached thereto.

What is claimed is:

1. A rail for installation on a hospital wall or the like suitable for support of brackets and clamps for hospital apparatus, said rail having a back, a substantially planar top substantially perpendicular to said back, a substantially planar bottom parallel to said top and a front, said front formed with a longitudinal inward extending opening having a top edge spaced down from said top, a bottom edge spaced up from said bottom, an upward extension inward of said top edge, a downward extension inward of said bottom edge and a back wall spaced forward of said back, said top edge being spaced below said top a greater distance than said bottom edge is spaced above said bottom.

2. A rail according to claim 1 in which said opening is shaped inwardly of said top and bottom edges as an elongated rectangle having rounded internal corners.

3. A rail according to claim 1 in which said top and bottom are formed with shallow longitudinally extending grooves.

4. A rail for installation on a hospital wall or the like suitable for support of brackets and clamps for hospital apparatus, said rail having a back, a top, a bottom and a front, said front formed with a longitudinal inward extending opening having a top edge spaced down from said top, a bottom edge spaced up from said bottom, an upward extension inward of said top edge, a downward extension inward of said bottom edge and a back wall spaced forward of said back, said top edge being spaced below said top a greater distance than said bottom edge is spaced above said bottom, said top and bottom being formed with shallow longitudinally extending grooves, and a clamp, said clamp comprising
   a body shaped to fit across said front and having means for attachment of hospital apparatus to said clamp,
   a fixed first stud fixed to said body having a first bead on its distal end shaped to engage a first of said longitudinal grooves, said first stud being on one side of said rail,
   a rotatable second stud rotatable in said body, said second stud having a second bead on its distal end shaped to clamp said rail by engaging a second of said longitudinal grooves when said second stud is in first position and to be disengaged from said second longitudinal groove when said second stud is in second position, said second stud being on the side of said rail opposite said first stud and means on said body to move said second stud between position.

5. A combination of claim 4 in which said second bead is formed with a flat so that when said second bead is in second position said flat said rail.

6. A combination of claim 4 in which said second stud is rotatable to a third position intermediate said first and second position to cause said second bead to fit partially into said second longitudinal grooves to permit said clamp to slide longitudinally of said rail without disengagement from said rail.

7. The combination of claim 4 in which said last named means comprises a knob fixed for rotation with said second stud.

8. The combination of claim 7 which further comprises a spring-biased detent in said knob and plural depressions in said body engageable with said detent to locate said second stud in either of said positions.

9. The combination of claim 8 in which said knob is of cylindrical shape but a portion of said cylindrical shape is truncated.

10. A clamp for use with a rail having a front and top and bottom faces, one said face having a first shallow longitudinal groove spaced rearward of said front and the other said face having a second shallow longitudinal groove spaced rearward on said front, said clamp comprising
    a body shaped to fit over said front transversely of said rail,
    a first stud projecting rearward of said body on one side of said rail having a first bead shaped to partially fit into said first groove,
    a second stud projecting rearward of said body on the side of said rail opposite said first stud, said second stud being movable relative to said body between first and second positions, said second stud having a second bead shaped to clamp said second groove when said second stud is in first position to restrain longitudinal movement of said clamp relative to said rail and to disengage from said second groove when said second stud is in second position,
    and adjustment means on said body to move said second stud between positions.

11. A clamp according to claim 10 in which said second bead is generally circular but formed with a flat, said flat being parallel to said rail when said second stud is in second position to permit removal of said clamp from a rail.

12. A clamp according to claim 10 in which said second stud is movable to a third position intermediate said first and second positions, said flat being at an angle to said rail when said second stud is in third position to permit sliding of said clamp along said rail without disengagement of said clamp from said rail.

13. A clamp according to claim 10 in which said second stud is rotatable in said body and said adjustment means is a knob fixed for rotation with said second stud.

14. A clamp according to claim 13, in which said knob is formed with a bore facing said body and which further comprises a detent and a spring in said bore biasing said detent toward said body.

15. A clamp according to claim 14 in which said body is formed with a plurality of depressions in which said detent engages to locate said second stud in one of said positions.

16. A clamp according to claim 15 in which said knob is generally cylindrical and has an outer end truncated by a second flat.

* * * * *